United States Patent
Dauneria et al.

(10) Patent No.: US 10,405,159 B2
(45) Date of Patent: Sep. 3, 2019

(54) METHODS AND APPARATUS FOR MONITORING AND MANAGING RESOURCE USAGE IN A COMMUNICATION NETWORK

(71) Applicant: Telefonaktiebolaget LM Ericsson (publ), Stockholm (SE)

(72) Inventors: Ankur Dauneria, New Delhi (IN); Sandeep Akhouri, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 15/542,127

(22) PCT Filed: Jan. 12, 2015

(86) PCT No.: PCT/IN2015/050004
§ 371 (c)(1),
(2) Date: Jul. 7, 2017

(87) PCT Pub. No.: WO2016/113750
PCT Pub. Date: Jul. 21, 2016

(65) Prior Publication Data
US 2018/0262889 A1    Sep. 13, 2018

(51) Int. Cl.
*H04W 4/70*    (2018.01)
*G06F 11/00*    (2006.01)
(Continued)

(52) U.S. Cl.
CPC .............. *H04W 4/70* (2018.02); *G06F 11/00* (2013.01); *G06F 11/30* (2013.01);
(Continued)

(58) Field of Classification Search
CPC ... H04W 4/70; H04W 16/00; H04W 28/0215; H04W 72/04; H04W 92/18; H04W 72/00;
(Continued)

(56) References Cited

U.S. PATENT DOCUMENTS

2010/0122334 A1*  5/2010  Stanzione .......... G06Q 10/0637
                                              726/11
2011/0096749 A1*  4/2011  Rune .................... H04W 76/12
                                              370/331
(Continued)

FOREIGN PATENT DOCUMENTS

EP    2385657 A2    11/2011
EP    2958398 A1    12/2015
(Continued)

OTHER PUBLICATIONS

Supplementary European Search Report—EP 15877727.6—dated Jan. 10, 2018—pp. 8.
(Continued)

*Primary Examiner* — Tejis Daya
(74) *Attorney, Agent, or Firm* — Sage Patent Group

(57) ABSTRACT

A method, in a monitoring function, for monitoring resource usage in a communication network comprising a plurality of M2M devices is disclosed. The method comprises detecting issuance of a user instruction (120), the user instruction specifying an action to be carried out by at least one of the M2M devices, identifying M2M devices subject to the user instruction (120), calculating an impact upon the communication network of completion of the action by the identified M2M devices (140), and sending the calculated impact to a resource management function (150). Also disclosed is a method, in a resource management function, for managing resources in a communication network comprising a plurality of M2M devices. The method comprises receiving, from a monitoring function, a calculated impact upon the communication network of completion of an action by M2M devices subject to a user instruction specifying the action (260), and adjusting resource allocation within the network according to the calculated impact (270). Also disclosed are
(Continued)

a monitoring element, a resource management element and a computer program product.

17 Claims, 12 Drawing Sheets

(51) Int. Cl.
| | | |
|---|---|---|
| *H04W 28/00* | (2009.01) | |
| *H04W 72/00* | (2009.01) | |
| *H04W 92/18* | (2009.01) | |
| *H04L 12/64* | (2006.01) | |
| *G06F 11/30* | (2006.01) | |
| *H04L 12/24* | (2006.01) | |
| *H04L 12/26* | (2006.01) | |
| *H04W 28/02* | (2009.01) | |
| *H04W 72/04* | (2009.01) | |
| *H04L 29/08* | (2006.01) | |
| *H04W 16/04* | (2009.01) | |
| *H04W 16/00* | (2009.01) | |

(52) U.S. Cl.
CPC ...... *H04L 12/6418* (2013.01); *H04L 41/0893* (2013.01); *H04L 43/0876* (2013.01); *H04L 67/12* (2013.01); *H04W 16/04* (2013.01); *H04W 28/00* (2013.01); *H04W 28/0215* (2013.01); *H04W 72/00* (2013.01); *H04W 72/04* (2013.01); *H04W 92/18* (2013.01); *H04W 16/00* (2013.01)

(58) Field of Classification Search
CPC .... H04W 28/00; H04L 67/12; H04L 43/0876; H04L 41/0893; H04L 12/6418; G06F 11/30; G06F 9/50; G06F 11/00
See application file for complete search history.

(56) References Cited

U.S. PATENT DOCUMENTS

| | | | | |
|---|---|---|---|---|
| 2011/0270973 | A1* | 11/2011 | Liao | H04L 41/0681 709/224 |
| 2012/0030358 | A1* | 2/2012 | MacKenzie | H04W 4/70 709/226 |
| 2014/0221032 | A1 | 8/2014 | Yang | |
| 2015/0381763 | A1* | 12/2015 | Moon | H04W 4/70 709/203 |
| 2017/0094061 | A1* | 3/2017 | Tu | H04M 3/58 |

FOREIGN PATENT DOCUMENTS

| | | |
|---|---|---|
| WO | 2012109531 A2 | 10/2012 |
| WO | WO2014126195 A1 | 8/2014 |

OTHER PUBLICATIONS

International Search Report and Written Opinion issued in International Application No. PCT/IN2015/05004, dated Aug. 17, 2015, 8 pages.
ETSI TS 102 690 V2.1.1, "Machine-to-Machine communications (M2M); Functional architecture," Oct. 2013, 332 pages.
ETSI TS 129 212 V7.4.0, "Universal Mobile Telecommunications System (UMTS); Policy and charging control over Gx reference point (3GPP TS 29.212 version 7.4.0 Release 7)" Apr. 2008, 45 pages.
ETSI TS 123 203 V12.6.0, "Digital cellular telecommunications system (Phase 2+); Universal Mobile Telecommunications System (UMTS); LTE; Policy and charging control architecture (3GPP TS 23.203 version 12.6.0 Release 12)," Sep. 2014, 221 pages.
Open Mobile Alliance, "Enabler Release Definition for Gateway Management Object (GwMO)," Candidate Version 1.0—Aug. 31, 2010, 13 pages.
Micrium, "Designing the Internet of Things: Part 1: IoT Devices and Local Networks," dated Jun. 22, 2017, 4 pages.
Office Action for European Application No. EP15877727.6, dated Oct. 23, 2018, 5 pages.
Alheraish, A., "Design and Implementation of Home Automation System", IEEE Transactions on Consumer Electronics, IEEE Service Center, New York, NY, US, vol. 50, No. 4, Nov. 1, 2004, pp. 1087-1092.

* cited by examiner

METHODS AND APPARATUS FOR MONITORING AND MANAGING RESOURCE USAGE IN A COMMUNICATION NETWORK

CROSS REFERENCE TO RELATED APPLICATION(S)

This application is a 35 U.S.C. § 371 National Stage of International Patent Application No. PCT/IN2015/050004, filed Jan. 12, 2015, designating the United States, the disclosure of which is incorporated by reference.

TECHNICAL FIELD

The present invention relates to methods and apparatus for monitoring and managing resource usage in a communication network. The present invention also relates to a computer program product configured, when run on a computer, to carry out methods for monitoring and managing resource usage in a communication network.

BACKGROUND

Forecasts indicate that the number of devices connected via communication networks will increase substantially in the near future. It is expected that Machine-to-Machine (M2M) devices will contribute significantly to this increase. M2M devices are largely autonomous, often very small devices typically associated with equipment or apparatus as opposed to a human user. M2M devices may be largely stationary once deployed or may be mobile, for example when associated with mobile equipment. M2M devices use cellular or other types of communication networks to communicate with an application server, which may or may not be comprised within the communication network. The application server receives information from the M2M device and configures the M2M device remotely. M2M devices thus typically access the communication network more or less infrequently, transmitting and receiving very small amounts of data, or being polled for data. M2M devices represent a subset within the larger category of User Equipment devices (UEs), and may also be referred to as Machine Type Communication (MTC) devices or Machine Devices (MDs).

M2M devices are deployed in a wide range of industries and applications, including consumer electronics, residential, commercial and industrial buildings, industrial equipment, medical devices etc. An example deployment of M2M devices to a factory environment is illustrated in FIG. 1. The example deployment comprises a large number of connected sensors and actuators scattered over a wide area and communicating via wireless technology. A Wireless Sensor Network (WSN) 2 is deployed within the factory site, the WSN comprising the plurality of distributed sensors which monitor physical and environmental conditions including temperature, sound, and pressure. Data from each sensor passes through the WSN from node-to-node. WSN nodes are in general low cost devices, and so may be deployed in high volume. WSN nodes also typically operate at low power and so may use battery power or energy harvesting. The example M2M deployment also comprises an edge node 4 that includes Internet Protocol connectivity. The edge node 4 acts as a gateway between the WSN and the IP network. The edge node 4 can also perform local processing, provide local storage, and may have a user interface. The edge node may allow accessing and configuration of WSN nodes via a local area network or via the Internet.

Management of deployed M2M devices is an ongoing challenge, and with the increasing size and complexity of M2M deployments, management functionality is an important aspect of deployment planning. Interactive Voice Response (IVR) enables remote interaction with an M2M gateway (edge node) or with individual or multiple M2M devices through the use of voice and Dual-Tone Multi-Frequency signalling (DTMF) tones input via communications devices. The introduction of IVR circuitry in an M2M edge node may enable a user to communicate with the edge node from a remote location. Configuration data or information requests may then be passed to individual M2M nodes by the M2M gateway node via appropriate protocols for the deployment, including for example COAP or Lightweight M2M. IVR may be particularly useful for management of M2M deployments in constrained environments, which may for example be subject to extreme environmental conditions, cover very large geographical areas or be subject to other restrictions which make accessing the deployment, including its gateway nodes, particularly challenging. Examples of deployments for which IVR would be particularly advantageous include large scale agricultural monitoring for soil health or irrigation systems, multi-story building management for environmental or other conditions, complex industrial or medical installations etc.

The current scale of M2M deployments, with respect to the communication networks via which they communicate, is such that the management of these deployments has not significantly impacted the smooth functioning of the communication networks. However, as M2M deployments increase in size and complexity, deployment management, effected for example via IVR, may come to have a significant impact upon conditions within the communication network supporting the managed deployment. Controlling the network impact of managed M2M deployments will thus become an increasingly important challenge for communication network operators.

SUMMARY

It is an aim of the present invention to provide a method and apparatus which obviate or reduce at least one or more of the challenges mentioned above.

According to an aspect of the present invention, there is provided a method, in a monitoring function, for monitoring resource usage in a communication network comprising a plurality of Machine-to-Machine, M2M, devices. The method comprises detecting issuance of a user instruction, the user instruction specifying an action to be carried out by at least one of the M2M devices, identifying M2M devices subject to the user instruction, calculating an impact upon the communication network of completion of the action by the identified M2M devices, and sending the calculated impact to a resource management function.

According to examples of the invention, the monitoring function may be located in a core network node or in an edge node such as a gateway. According to further examples, the M2M devices may be mobile or stationary, and may connect to the network directly or via an edge node such as a gateway. The resources may comprise network bandwidth, Quality of service, network connection or cloud processing resources. In some examples, the user instruction may be issued by a human user, for example using a communication device such as a mobile phone or tablet computer to connect to a management platform such as an IVR platform. In further examples, the user instruction may be issued by an automated software module programmed to contact a management platform such as an IVR platform. In still further examples, the platform may comprise another management platform such as an Unstructured Supplementary Service Data (USSD) platform.

According to examples of the invention, the method may further comprise checking the number of devices subject to the instruction, and only proceeding with impact calculation if number of devices is over a threshold. According to such examples, network resources may only be managed to reduce the impact if the impact is likely to be big enough to warrant such management.

According to examples of the invention, detecting issuance of a user instruction may comprise detecting accessing by a user device of an Interactive Voice Response, IVR, platform for M2M functionality. The M2M functionality may for example include device management. As discussed above, the user device may be directly controlled by a human user or may be automated. The user device may for example be a UE such as a mobile phone, or may be a management function for a user installation, the management function being programmed to access the IVR platform according to a user installation protocol.

According to examples of the invention, identifying M2M devices subject to the user instruction may comprise identifying the user issuing the instruction. The user may be a user identity as represented by a human user or by a device programmed to issue user instructions.

According to examples of the invention, identifying the user issuing the instruction may comprise at least one of identifying the user device accessing the IVR platform or receiving user identification data input by the user to the IVR platform.

According to examples of the invention, identifying M2M devices subject to the user instruction may further comprise identifying M2M devices associated with the identified user. Identifying M2M devices subject to the user instruction may for example comprise for example consulting a profile which may be stored locally or on a network server. Identifying devices may therefore comprise querying a profile server or device or subscription database. Profiles may comprise User profiles associated with a User identity or subscription or may comprise Device profiles associated with a user device contacting the management platform.

According to examples of the invention, identifying M2M devices subject to the user instruction may further comprise identifying a subset of the M2M devices associated with the identified user, which subset is subject to the user instruction. Identifying a subset of devices subject to the instruction may in some examples comprise extracting device identities or device group identities from the instruction. The subset may comprise some or all of the devices associated with the user.

According to examples of the invention, the method may further comprise categorising the identified M2M devices according to at least one of a device type, a device group or community with which the device is associated, a service provided by the device, a service provider associated with the device, an application running on the device, a network traffic class or traffic characteristics supported by the device, and/or a subscription associated with the device.

According to examples of the invention, identifying M2M devices subject to the user instruction may comprise obtaining an identifier of M2M devices subject to the user instruction. The identifier may for example be a network identifier or may be a device identifier, for example if the M2M devices connect via a gateway, and hence do not have individual network identities. Examples of network identifiers may include Application identifier (App-ID), SCL identifier (SCL-ID), M2M node identifier (M2M-Node-ID), M2M Service Connection identifier (M2M-Connection-ID), M2M Service Provider identifier (M2M-SP-ID), MSBF identifier (MSBF-ID) and M2M Subscription ID.

According to examples of the invention, the action may comprise at least one of connecting to the communication network, disconnecting from the communication network, sending data via the communication network, and/or receiving data from the communication network.

In some examples, connecting to the network may comprise reconnecting after a period of disconnection. Connecting, sending and receiving may all comprise directly accessing the communication network or accessing the network via an edge node such as a gateway element. A single M2M device may thus access a local network which is connected to the communication network via a gateway. Examples of data sent may include sensor data, status data etc. Examples of data received may include configuration data, software/firmware updates, application data etc.

According to examples of the invention, calculating an impact upon the communication network of completion of the action by the identified M2M devices may comprise identifying the action, determining an impact type from the identified action, determining an impact magnitude from the identified M2M devices, and assembling the impact type and impact magnitude into a network impact calculation.

According to examples of the invention, identifying the action may comprise identifying the instruction and consulting a database to obtain an action specified by the instruction.

According to examples of the invention, identifying the instruction may comprise identifying a Dual Tone Multi Frequency, DTMF, option selected by the user device.

According to examples of the invention, the impact type may comprise at least one of connection, disconnection and/or traffic modification. According to some examples, traffic modification may comprise a change in traffic volumes and/or a change in traffic characteristics. For example, an instruction to provide data or to download software updates may result in an increase in Uplink or Downlink network traffic. Following a software update, packet payload sizes for packets through impacted devices may be changed, for example through the addition, deletion or modification of field structures.

According to examples of the invention, the impact magnitude may comprise at least one of a number of M2M devices, a list of M2M devices and/or a proportion of M2M devices. The proportion may be expressed as a fraction or percentage.

According to examples of the invention, the proportion may be with reference to a total number of M2M devices associated with the User issuing the instruction. According to further examples of the invention, the proportion may be with reference to a total number of M2M devices in the communication network.

According to examples of the invention, determining an impact magnitude may comprise determining at least one impact magnitude according to a criterion. The criterion may for example be selected by an operator of the communication network According to examples of the invention, the criterion may comprise at least one of device type, device attribute, device network identity and/or impact footprint. Examples of device type may include node, edge node, gateway etc. Examples of device attribute may include mobile, stationary, device capability, device location etc. Examples of device network identity may include service level identity, application level identity, subscription identity Service Capability Layer identity, Service Provider identity, Service Connection identity, Service identity, Traffic Class identity etc. Examples of impact footprint may include a time of impact, a geographical extent of impact, a network segment impacted, network routing nodes impacted etc.

According to examples of the invention, sending the calculated impact to a resource management function may comprise sending the criterion.

According to examples of the invention, sending the calculated impact to a resource management function may comprise sending the calculated impact to at least one of a Policy Charging and Control, PCC, node, a Connection Management Platform or a Cloud Computing Management node. In some examples, the calculated impact may be forwarded by the PCC node to the Cloud Computing Management node. In further examples, the calculated feedback may be sent directly to the Cloud Computing Management node.

According to another aspect of the present invention, there is provided a method, in a resource management function, for managing resources in a communication network comprising a plurality of Machine-to-Machine, M2M, devices. The method comprises receiving, from a monitoring function, a calculated impact upon the communication network of completion of an action by M2M devices subject to a user instruction specifying the action, and adjusting resource allocation within the network according to the calculated impact.

According to some examples, the resource management function may be comprised within a Policy Charging and Control, PCC, node, a Connection Management Platform or a Cloud Computing Management node. Examples of the resources may include network bandwidth, Quality of service, network connection or cloud processing resources.

According to some examples, the calculated impact may be received from a monitoring function carrying out a method according to the first aspect of the present invention.

According to some examples, adjusting resource allocation within the network according to the calculated impact may comprise establishing a resource management policy to mitigate the calculated impact. In some examples, establishing may comprise creating a new policy or amending an existing policy. The policy may be global or local, may be on a device basis, service basis or application basis and may apply to specific network sections or routing nodes such as gateways.

According to some examples, adjusting resource allocation within the network according to the calculated impact may comprise prioritising at least one class of traffic within the network. In some examples, the traffic class may correspond to a particular type of traffic or to traffic associated with a particular class of devices, subscriber or category of subscribers.

According to some examples, adjusting resource allocation within the network according to the calculated impact may comprise limiting access to resources by the M2M devices subject to the instruction. According to further examples, adjusting resource allocation within the network according to the calculated impact may comprise increasing resources available to the M2M devices subject to the instruction. Such resources may for example comprise cloud computing resources.

According to some examples, the method may further comprise adjusting a charging model according to the calculated impact.

According to another aspect of the present invention, there is provided a computer program product configured, when run on a computer, to carry out a method according to the first or second aspects of the present invention.

According to another aspect of the present invention, there is provided a monitoring element configured for monitoring resource usage in a communication network comprising a plurality of Machine-to-Machine, M2M devices. The monitoring element comprises a processor and a memory, the memory containing instructions executable by the processor such that the monitoring element is configured to carry out a method according to the first aspect of the present invention.

The monitoring element may in some examples be comprised within a core network of the communication network, or may be comprised within an edge node of the network such as a gateway.

According to another aspect of the present invention, there is provided a resource management element, configured for managing resources in a communication network comprising a plurality of Machine-to-Machine, M2M, devices. The resource management element comprises a processor and a memory, the memory containing instructions executable by the processor such that the resource management element is configured to carry out a method according to the second aspect of the present invention.

The resource management element may in some examples be comprised within a core network of the communication network, and may comprise a PCC node or a Connection Management Platform. In further examples, the resource management element may comprise a Cloud Computing Management node and may provision cloud processing resources such as memory, processing capacity etc.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide methods for monitoring and managing resource usage in a communication network, and particularly in a communication network comprising a plurality of M2M devices. As discussed above, management of M2M deployments, which may for example be effected via IVR, USSD or another management protocol, may come to have a significant impact upon conditions within the communication network supporting the managed M2M deployment. For example, significant numbers of devices may connect to or disconnect from the network following a single IVR or USSD instruction. In addition, the volume and characteristics of traffic exchanges between edge devices and user devices may alter dramatically as a consequence of a single IVR or USSD instruction. According to the present invention, such network impacts may be monitored and mitigated through the implementation of methods disclosed herein.

Figure 1:
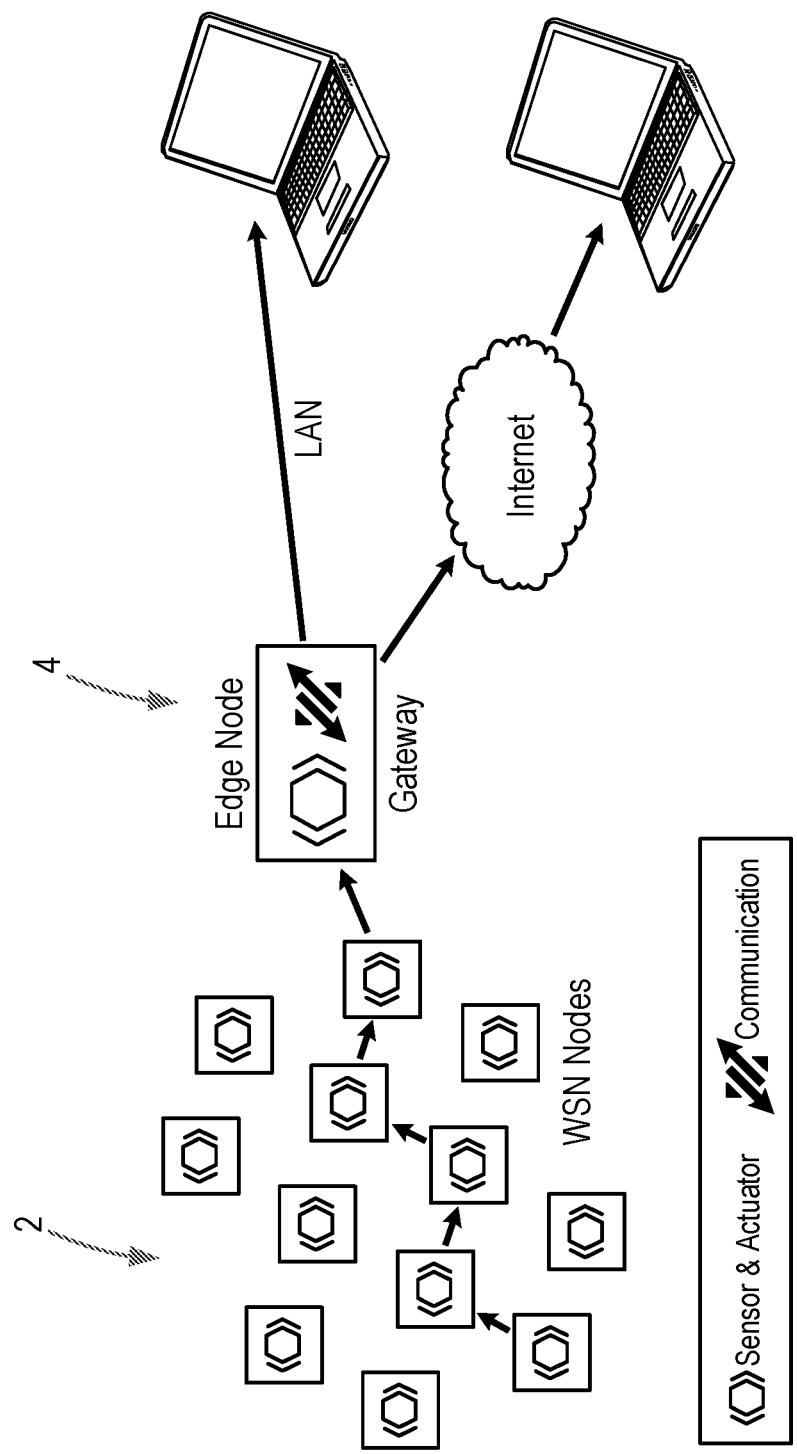
FIG. 1 illustrates an example deployment of M2M devices.

FIG. 1 is a flow chart illustrating a first example of a method 100 for monitoring resource usage in a communication network comprising a plurality of M2M devices. The M2M devices may be stationary or mobile, and may connect to the network directly or via an edge node such as a gateway. The resources monitored may be network bandwidth, Quality of service, network connection or cloud processing resources, and the method may be conducted in a monitoring function which may be located in a core network node or in an edge node such as a gateway.

Referring to FIG. 1, in a first step 110, the method comprises detecting issuance of a user instruction, the user instruction specifying an action to be carried out by at least one of the M2M devices. The user instruction may be received from a user identity, which may be represented by a human user or by an automated software module. The instruction may be received at an IVR management platform from a user device. In a second step 120, the method comprises identifying M2M devices subject to the user instruction. In some examples, the method may further comprise checking the number of devices subject to the instruction and only proceeding with the subsequent method steps if the number of devices is over a threshold. In such examples, subsequent monitoring and management of resources may only be carried out if the impact upon the network caused by carrying out the received instruction is likely to be significant and therefore to warrant such action.

Following identification of M2M devices subject to the user instruction at step 120, the method comprises calculating an impact upon the communication network of completion of the action by the identified M2M devices at step 140. Finally, the calculated impact is sent to a resource management function in step 150. The resource management function may for example be a PCC, a Connection Management Platform or a Cloud Computing Management node.

Figure 3:
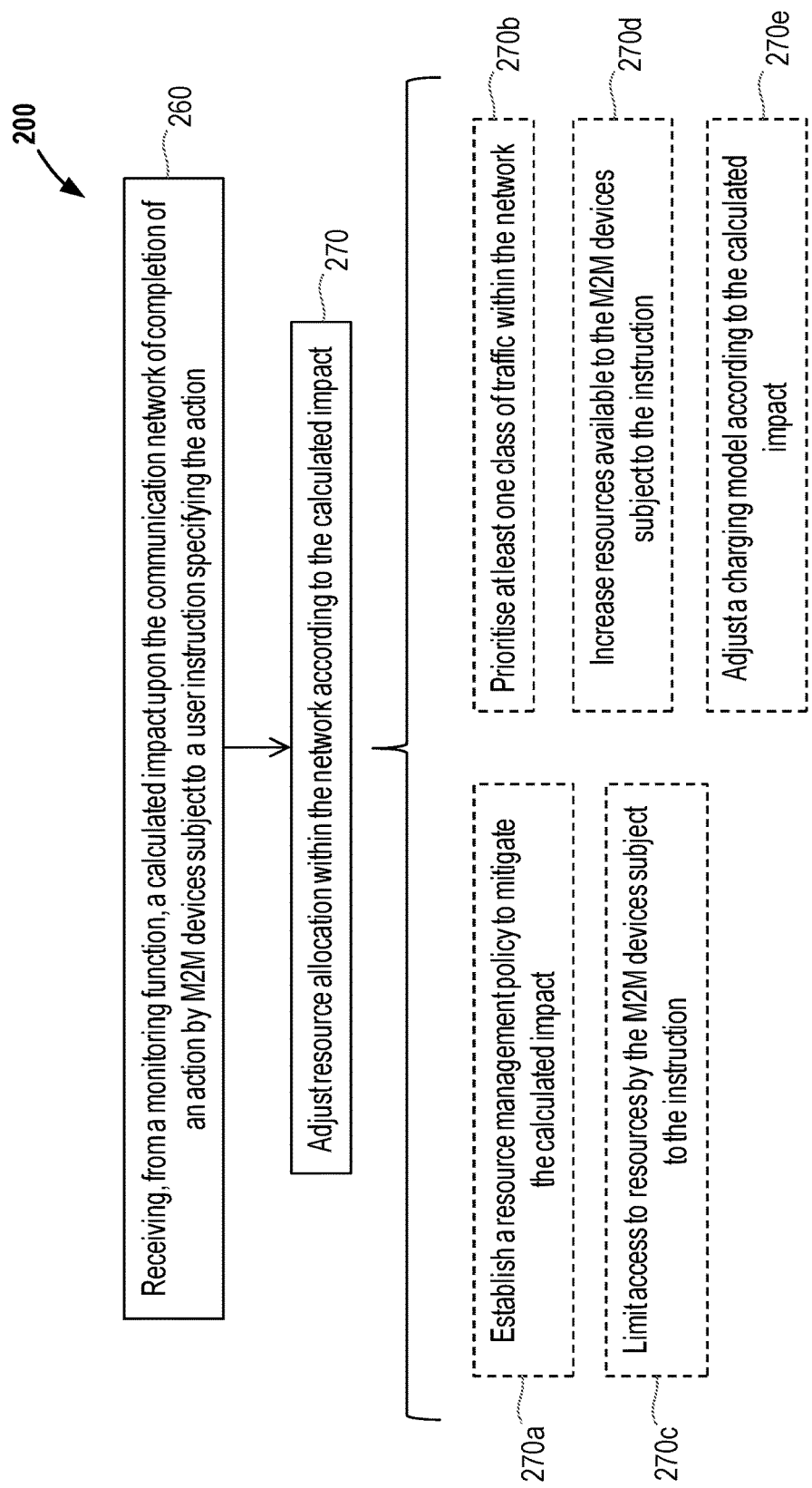
FIG. 3 is a flow chart illustrating process steps in a method for managing resources in a communication network.

FIG. 3 is a flow chart illustrating process steps in a method for managing resource usage in a communication network comprising a plurality of M2M devices. The steps of the method 200 may complement the steps of the method 100, enabling action to be taken by the network to mitigate the calculated impact of the carrying out by the affected M2M devices of the received user instruction. The method 200 may be conducted in a resource management function such as a PCC, a Connection Management Platform or a Cloud Computing Management node.

Referring to FIG. 3, in a first step 260, the method comprises receiving, from a monitoring function, a calculated impact upon the communication network of completion of an action by M2M devices subject to a user instruction specifying the action. In step 270, the method then comprises adjusting resource allocation within the communication network according to the calculated impact. The adjustment of resource allocation may take a range of different forms, including, in step 270a the establishment of a resource management policy to mitigate the calculated impact. Establishing a policy may comprise creating a new policy or modifying an existing policy. In some examples, the adjustment of resource allocation may comprise prioritising at least one class or category of traffic within the network according to step 270b, which prioritisation may be achieved via the establishment of suitable policies. In further examples, the adjustment of resource allocation may comprise increasing resources available to the M2M devices subject to the user instruction in step 270d, or limiting access to resources by the M2M devices subject to the user instruction in step 270c. In the case of M2M devices requiring cloud computing resources such as processing capacity and memory, additional such resources may be brought online to service the action specified by the user instruction, or alternatively, access to such resources may be limited to ensure other users are not adversely affected. Finally, a charging model may be adjusted according to the calculated impact in step 270e. The adjustment of a charging model may ensure that a user identity is charged proportionately to the resources required to complete the action of the user instruction, or may be charged for example proportionately to the impact the completion of the action has on the communication network. Such charging may incentivise the issuing of user instructions in such a manner and at such a time as to minimise network impact.

Figure 2:
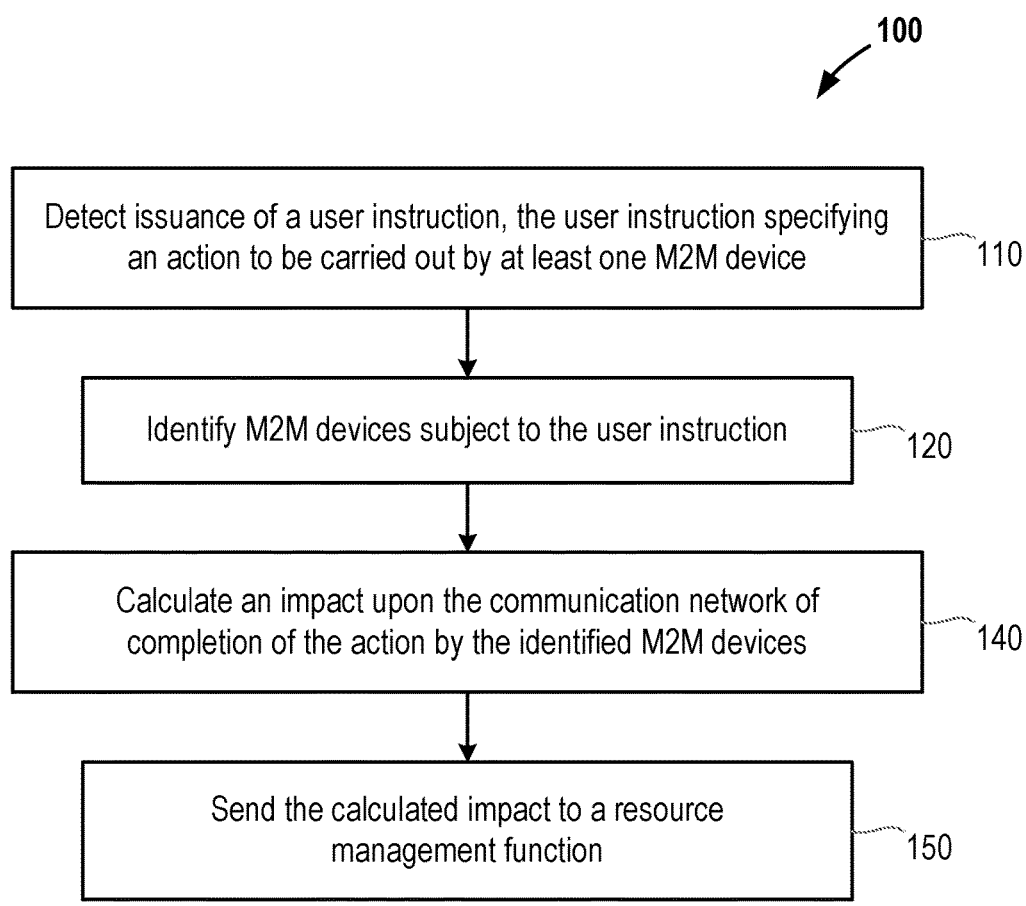
FIG. 2 is a flow chart illustrating process steps in a method for monitoring resource usage in a communication network.
Figure 4:
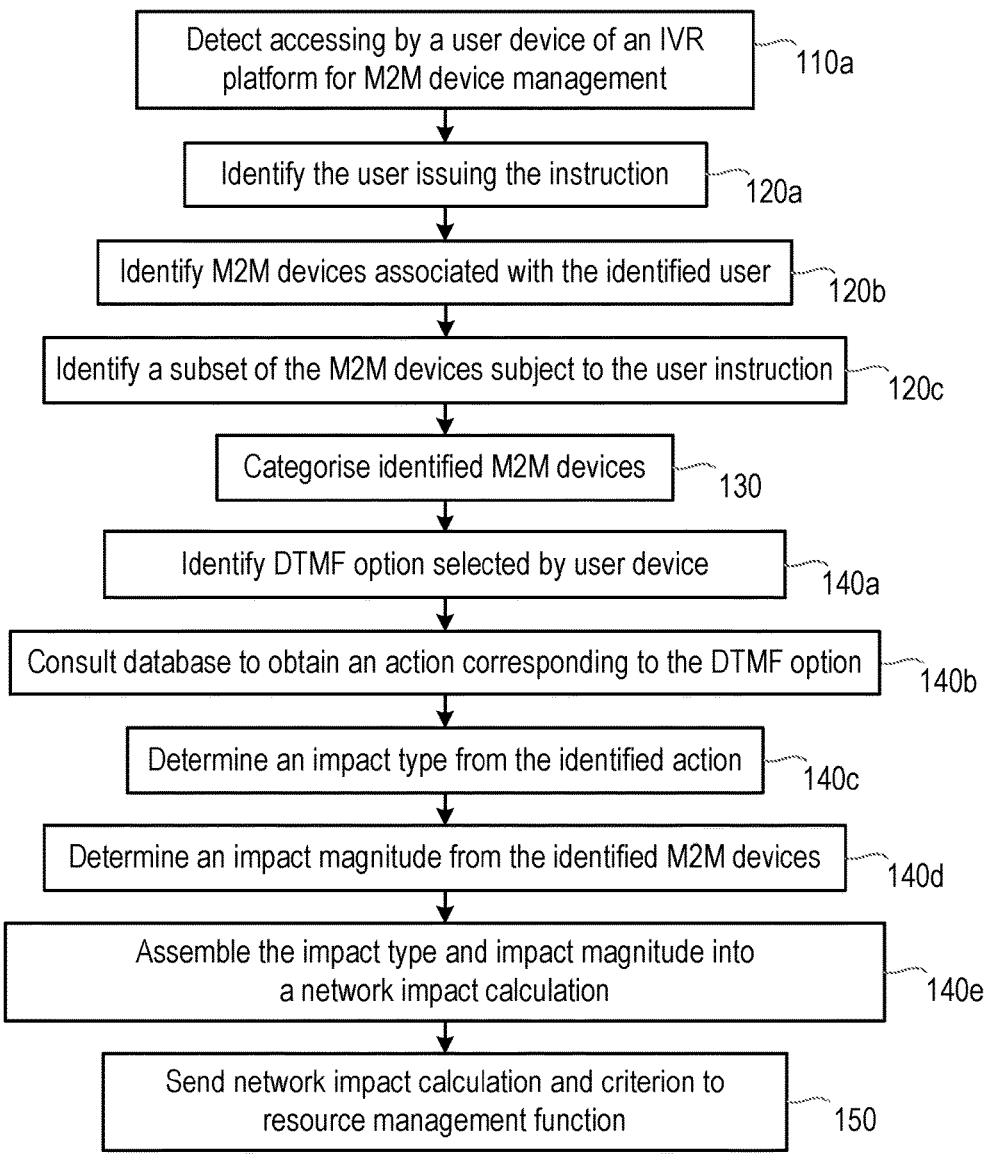
FIG. 4 is a flow chart illustrating process steps in another method for monitoring resource usage in a communication network.

FIG. 4 is a flow chart illustrating one example implementation of the method 100 of FIG. 2 in a monitoring function. The flow chart of FIG. 4 illustrates how the steps of the method 100 of FIG. 2 may be subdivided and supplemented to achieve the above discussed functionality. It will be appreciated that the flow chart of FIG. 4 is merely one example of how the steps of the method 100 may be implemented, other example implementations being possible. The example of FIG. 4 illustrates implementation of the method 100 in a communication network comprising a plurality of M2M devices, at least one deployment of such devices being managed via IVR.

Referring to FIG. 4, in a first step 110a, the monitoring function detects accessing by a user device of an IVR platform for M2M functionality. The IVR platform is accessed to issue a user instruction to one of more M2M devices managed via the IVR platform. In the illustrated example, the M2M functionality provided by the platform is device management. The user device may be manipulated by a human user, such as an operator calling in to the IVR platform via a Smartphone or tablet. In other examples, the user device may be manipulated by an automated software module, which may be programmed to conduct certain management functionality of the M2M deployment independently of human intervention. The IVR platform accessed by the user device may be based at a gateway device of the managed M2M deployment or may be located within the core network of the communication network supporting the M2M deployment. A mobile network operator may determine from the access whether the user device has accessed an IVR platform at a gateway device of the M2M deployment or within the mobile network operator's core network.

Having detected accessing by a user device of the IVR platform, the monitoring function then proceeds, at step 120a, to identify the user issuing the instruction. In some examples, identification may be achieved by identifying the user device accessing the IVR platform and then consulting an appropriate database to obtain the user identity associated with the user device. The database may be held locally or remotely. In other examples, user identification information may be provided directly to the monitoring function via the IVR platform. Following identification of the user, the monitoring function then proceeds to identify M2M devices associated with the identified user in step 120b. This may be achieved by querying a profile database for a user profile associated with the user identity, or a device profile associated with the user device. The profile may enable identification of all M2M devices associated with the user identity and within a domain of a mobile network operator. Such devices may include a range of different kinds of M2M devices including stationary, mobile, constrained, non constrained, mains powered, battery powered and energy harvesting.

The M2M devices associated with the identified user may be edge devices or M2M nodes. In the case of edge devices, the actual M2M node devices may not be visible to the monitoring function, as the M2M nodes may connect to the communication network via the gateway. In such cases, the monitoring function may identify the gateway nodes associated with the identified user, and may then consult gateway profiles or configurations to determine the number of devices, device types and device groups associated with each gateway, as well as their respective identities, LAN addresses, address types etc.

Having identified the M2M devices associated with the identified user, the monitoring function then proceeds to identify a subset of the identified M2M devices, which subset is subject to the received user instruction, in step 120c. A user instruction issued via IVR may apply to all or only to some of the M2M devices associated with a user. The subset may thus comprise all or only some of the identified M2M devices. In some examples, the identification of the subset of M2M devices subject to the user instruction may be achieved as part of the identification of the action corresponding to the user instruction, discussed in greater detail below with reference to steps 140a and 140b and FIG. 5.

The identified M2M devices, or subset of identified M2M devices, is then categorised in step 130. A range of different criteria may be used to categorise the devices including device type, device group with which the device is associated, service provided by the device, service provider associated with the device, application running on the device, network traffic class supported by the device and/or a subscription associated with the device. Each categorised M2M device may be identified using a network identifier or a device identifier, for example if the devices connect via a gateway and thus do not have a network identifier. Suitable identifiers may include Application identifier (App-ID), SCL identifier (SCL-ID), M2M node identifier (M2M-Node-ID), M2M Service Connection identifier (M2M-Connection-ID), M2M Service Provider identifier (M2M-SP-ID), MSBF identifier (MSBF-ID) and M2M Subscription ID.

Following categorisation, the monitoring function proceeds to identify a DTMF option selected by the user device in step 140a, and to consult a database to obtain an action corresponding to the DTMF option in step 140b. In this manner, the monitoring function may identify what action has been instructed by the user device. The action may comprise a wide range of different processing steps but in general may be categorised as comprising either connecting to the communication network, disconnecting from the communication network, sending data via the communication network and/or receiving data from the communication network. For example, providing stored sensor data may comprise connecting to the network and sending data via the network. Updating firmware may comprise connecting to the network and receiving data from the network, etc. The connections to and from the network, and sending and receiving of data, may all be accomplished via a gateway node if the M2M devices subject to the instruction communicate with the network via a gateway.

With the action identified, the monitoring function then determines an impact type from the identified action at step 140c. The impact type comprises one of connection, which may include re-connection, disconnection, and traffic modification. Traffic modification may comprise a change in traffic volumes and/or a change in traffic characteristics. For example, an instruction to provide data or to download software updates may result in an increase in Uplink or Downlink network traffic. Following a software update, packet payload sizes for packets through impacted devices may be changed, for example through the addition, deletion or modification of field structures.

The monitoring function then determines an impact magnitude from the identified M2M devices at step 140d. The impact magnitude may comprise a number of M2M devices, a list of M2M devices or a proportion of M2M devices. The proportion may be with reference to the number of M2M devices associated with the identified user or the total number of M2M devices connected to the communication network, or may be with reference to another factor.

The impact type and impact magnitude are then assembled into a network impact calculation at step 140e, calculation of which may be determined according to a criterion. For example, impact calculations may be assembled for devices of a particular type, having a particular attribute or combination of attributes, devices belonging to a particular group, devices having a particular network identity or according to impact footprint. Examples of different criteria according to which impact calculations may be determined are given below:

Device type: edge node, gateway node.
Device attribute: mobile device, stationary device, device capability, device location.
Device network identity: service level identity, application level identity, subscription identity, Service Capability Layer identity, Service Provider identity, Service Connection identity, Service identity, Traffic Class identity.
Impact footprint: time of impact, geographical extent of impact, network segment, sector or domain impacted, network routing nodes impacted.

A particular criterion according to which impact calculations are to be determined may be selected by a network operator, for example according to network priorities, availability of certain network resources etc. In this manner, criteria specific impact calculations may be assembled, enabling a targeted study of network impact to be made.

Examples of impact calculations are given below illustrating some of the different forms that an impact calculation may take:

$$\% \text{ Connected (per profile or per criteria)} =$$

$$\frac{\text{Number of new Connected}}{\text{Total Number of } M2M \text{ devices attached to profile or criteria}} \times 100$$

In the above example, the impact type is Connection and the impact magnitude is expressed as a percentage of the total number of M2M devices attached to a profile or a criterion. In some examples, both a profile and one or more additional criteria may be applied to further target the impact study, thus the impact calculation may apply to the devices associated with user X and being located in a particular geographical area, providing a specific service or conducting the action within a specific time frame.

$$\% \text{ Disconnected (per profile or per criteria)} =$$

$$\frac{\text{Number of new Disconnected}}{\text{Total Number of } M2M \text{ devices attached to profile or criteria}} \times 100$$

In the above example, the impact magnitude is expressed again as a percentage but the impact type is Disconnection. Again, both profile and one or more criteria may be applied to the calculation to narrow the scope of the impact calculation.

$$\% \text{ Re-Connected (per profile or per criteria)} =$$

$$\frac{\text{Number of new Reconnected}}{\text{Total Number of } M2M \text{ devices attached to profile or criteria}} \times 100$$

The above example focuses on a subset of impact type Connection that comprises re-connection of devices previously connected to the network.
Number of devices in profile Z and criterion Y increasing packet payload size=XX
In the above example, the impact type is traffic modification and the impact magnitude is expressed as a total number of devices. Profile Z may be the profile of a particular user identity Z and criterion Y may for example be a particular application identifier, narrowing the impact calculation to only devices running a particular application.
Devices increasing UL traffic in profile Z and criterion Y=M2M-Node-ID_i
M2M-Node-ID_ii
M2M-Node-ID_iii
. . . .
In the above example, the impact type is traffic modification and the impact magnitude is expressed as a list of devices. Profile Z may be the profile of a particular user identity Z and criterion Y may for example be a particular service provider identifier, narrowing the impact calculation to only devices associated with a particular service provider.
Other examples of impact calculations may be envisaged in accordance with the above descriptions of impact type, impact magnitude and criteria.
In the case of an action to be carried out by M2M devices that connect to the communication network via a gateway device, device identities in a gateway configuration profile may be used and may feature in impact calculations with impact magnitude expressed as device lists. Device lists, numbers and proportions may be assembled as impact calculations per gateway device, in order to identify network impact at specific gateway devices. Individual, gateway specific criteria may also be applied at individual gateway devices.

It will be appreciated from the above that the impact calculations assembled at step 140e may be numerous and may vary widely according to the manner in which they are expressed and the number and type of criteria which a network operator may choose to apply. The assembled impact calculations are sent, together with any appropriate criteria applied, to a resource management function as feedback in step 150. The feedback sent in step 150 allows the resource management function, for example a PCC or Connection Management Platform, to establish resource management policies to mitigate the calculated impact.

As noted above, as part of the example method illustrated in FIG. 4, the monitoring function identifies an action corresponding to a received user instruction by identifying a DTMF tone and consulting a database. This process is explained in greater detail below with reference to FIG. 5.

Figure 5:
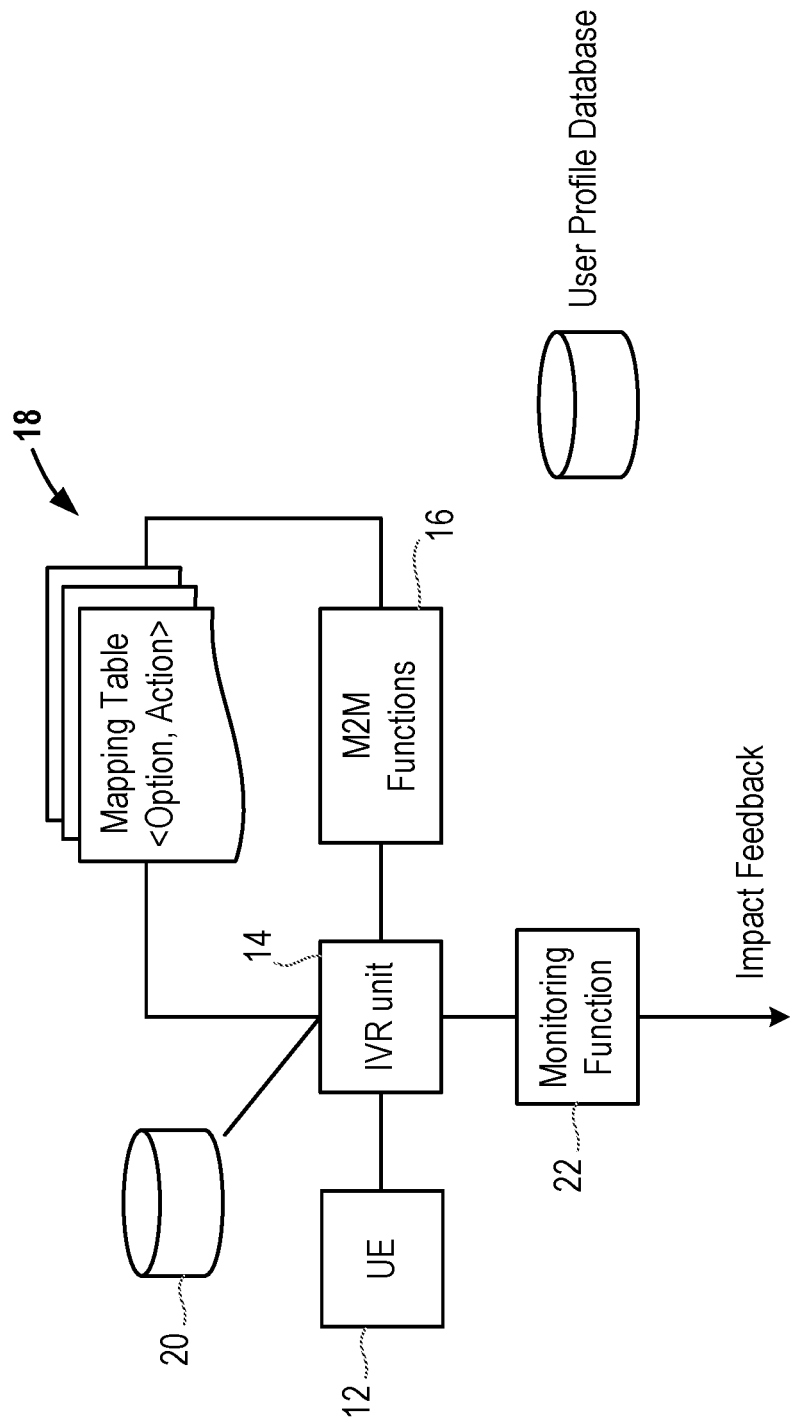
FIG. 5 is a schematic illustration of functional relations with a monitoring function.

FIG. 5 illustrates functional relations between a UE 12, an IVR unit 14, an M2M functional unit 16, a user profile database 18, a mapping table 20 and a monitoring function 22. Either one or both of the IVR unit and monitoring function may be located at a gateway node for the relevant M2M nodes, in a mobile network operator's core network or in another appropriate location.

When the UE 12, either prompted by a human operator or by a software module, accesses the IVR based service, the IVR unit 14 presents options and corresponding actions. The UE 12 issues an instruction by selecting an option on the IVR interface, and the IVR unit 14 interacts with the M2M functions unit 16 to ensure the stored action is executed according to the chosen option. Concurrently, according to aspects of the present invention, the monitoring function 22 assembles impact calculations and provides these calculations as feedback to a resource monitoring function to enable mitigation of network impact of the instructed action.

A sample IVR Menu structure having a tree format is illustrated below:
Sample IVR Menu
  Option: '0'
    Action: 'A'
  Option: '1'
    Action: 'B'
  Option: '2'
    Action: 'C'
  Option: '3'
    Action: 'D'
  Option: 'Return'
{0, 1, 2, 3} are IVR service based menu options relating to M2M functions, which options are available to end users via the IVR interface. Menus may also contain nested options in a tree format, for example starting with language preference and providing additional sub-options for each of options 0, 1, 2, 3. {A, B, C, D} are M2M function related actions stored against respective IVR options. These actions may be a task or a set of multiple related tasks executing sequentially or in some specific order to perform a task. The task may include software update, application provision, status updates, device discovery, device attach, device detach, triggering, monitoring, commit functions etc.

In an example case, a user in the form of a human operator may call an IVR platform using his UE 12. The operator managing the core of the communication network, for example a 3GPP Core Network, identifies using standard procedures that a particular user has called an IVR unit 14 hosted in his network or gateway. The user is made aware of the IVR menu structure by IVR unit.

The monitoring function 22 identifies a user profile by using an identity of the UE 12 or a profile identity as entered by the user explicitly into the IVR system. Using the profile identity, user profile database 20 and any additional information entered by user, the monitoring function 22 identifies the number of M2M devices impacted by the option selected by the user. Based on the selected option or options, the monitoring function obtains the associated actions from the mapping table 18 and assembles impact calculations according to the actions and identified devices. Impact calculations may vary according to the different possible actions, each of which may comprise one or more processing tasks. Additional information inputs may be received modifying the number of devices which the user wants to handle at one time during the M2M functions execution. Devices may be identified according to device categories, sub-profiles, subscription, services, applications etc.

A more detailed sample IVR menu is illustrated below with example actions against the different options.
Sample IVR Menu:
  Option: '0'
    Action: 'Turn all devices off-line'
  Option: '1'
    Action: 'Update firmware in all devices'
  Option: '2'
    Action: 'Provision applications in all devices'
  Option: '3'
    Action: 'Get device status'
      Option: '3.1'
        Action: 'Enter (ID or All)'

The mapping table 18 for the above sample menu would contain following entries:
<'0', 'Turn all devices off-line'>
<'1', 'Update firmware in all devices'>
<'2', 'Provision an application in all devices'>
<'3', 'Get device status'>
<'3.1', 'Enter (ID or ALL)'>

As discussed above, each selected option may have different impacts upon the communication network: devices connecting, disconnecting or reconnecting to the network, uplink and downlink traffic changes (rise or fall) relating to the number of connected devices, different device types going off-line or coming back on-line, changes in volume or characteristics of network traffic on existing network connections or sessions involving the affected M2M devices etc. Impact may be further narrowed according to operator criteria such as M2M subscriptions, services, device types, applications, service capability layers etc.

Continuing the above example case, if the user selects IVR option '0', the corresponding stored action is 'Turn all devices off-line' according to the above sample IVR menu. Using a user profile from the user database 20, the monitoring function 22 determines the number of devices associated with the user, and may determine their identities. The selected action involves turning all devices off-line at once, meaning all network connections or sessions associated with the devices will be terminated, leading to a fall in network traffic and connections. Executing this action will impact the network and the monitoring function 22 assembles impact calculations according to operator criteria and then sends these calculations as feedback to a resource management function, enabling the resource management function to establish and implement policies to mitigate this impact. In the case of a positive impact on resource availability, mitigation may involve increasing resource availability to other users, or to remaining connected devices associated with the instructing user.

Figure 6:
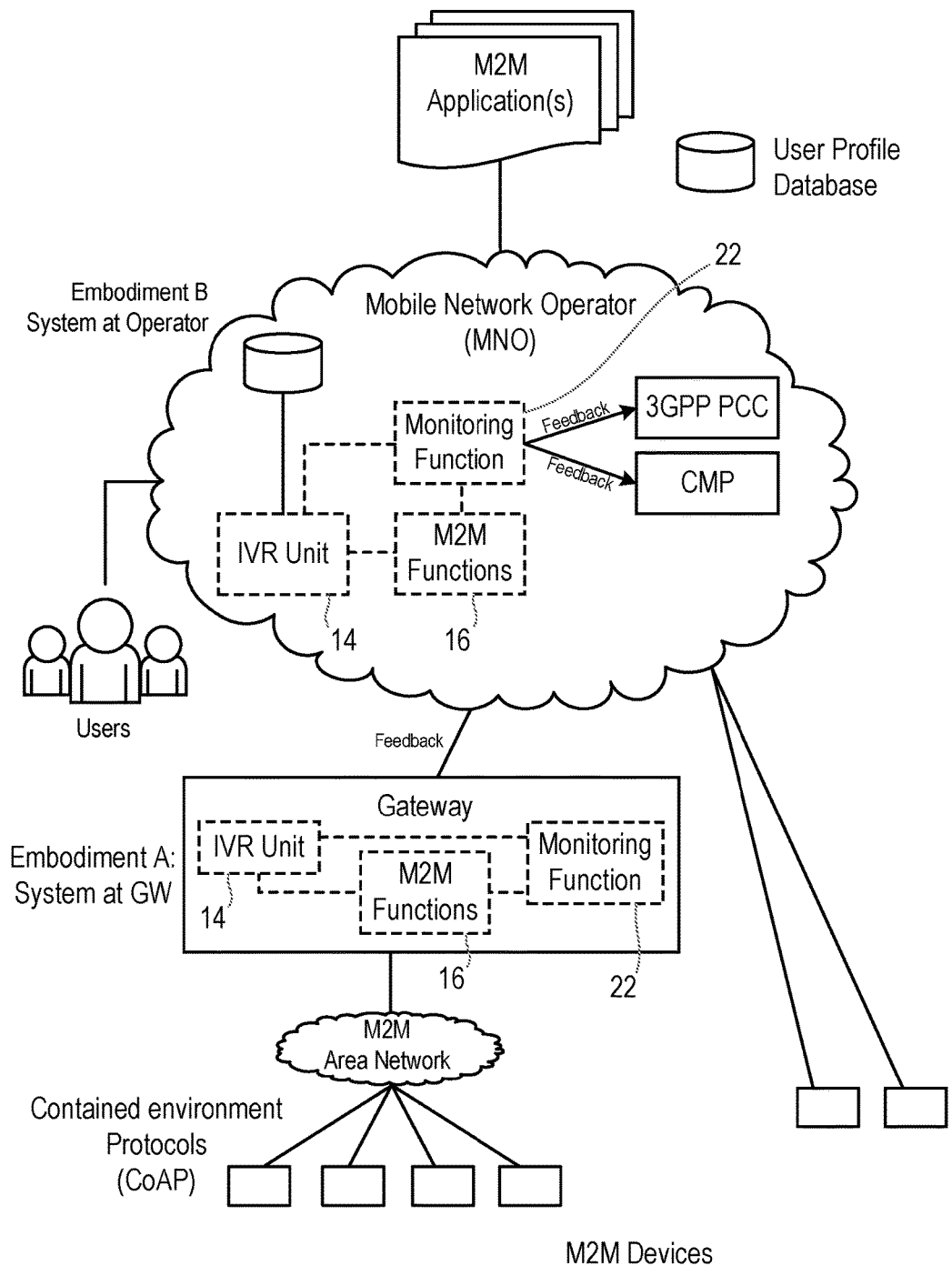
FIG. 6 illustrates deployment of a monitoring function.

As discussed above, the monitoring function 22 may be located in a gateway node or in a core network of the communication network. FIG. 6 illustrates two different embodiments, according to which the IVR unit 14, M2M functions unit 16 and monitoring function 22 are located A: in a gateway node, and B: in a core network. According to embodiment B, feedback in the form of the impact calculation may be sent directly to resource management functions such as the PCC and Connection Management Platform which are also located in the core network. According to embodiment A, feedback must first be sent from the gateway to the core network, where it can be distributed to the resource management functions.

Figure 7:
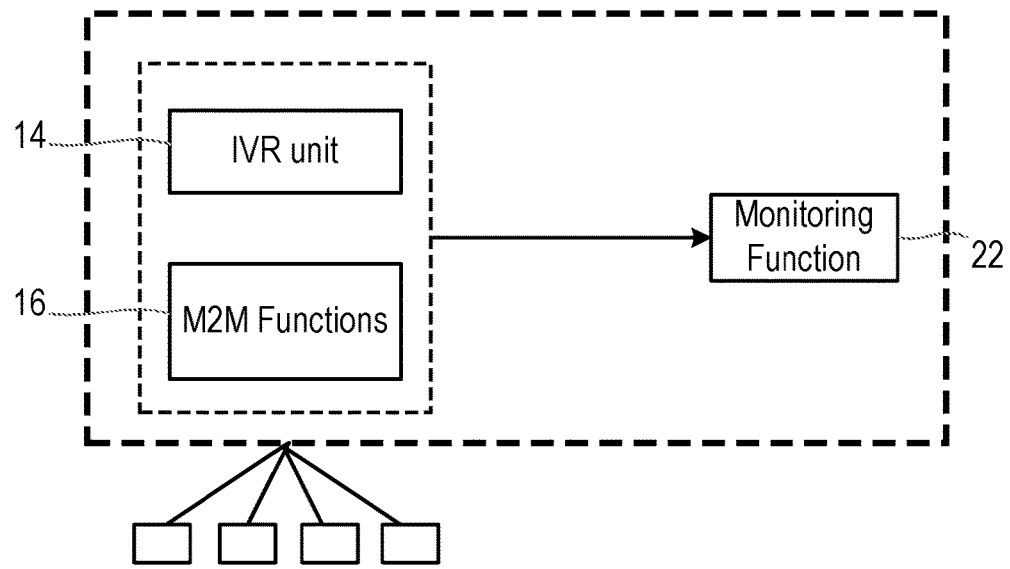
FIG. 7 illustrates communication between a monitoring function and elements of an M2M deployment.
Figure 8:
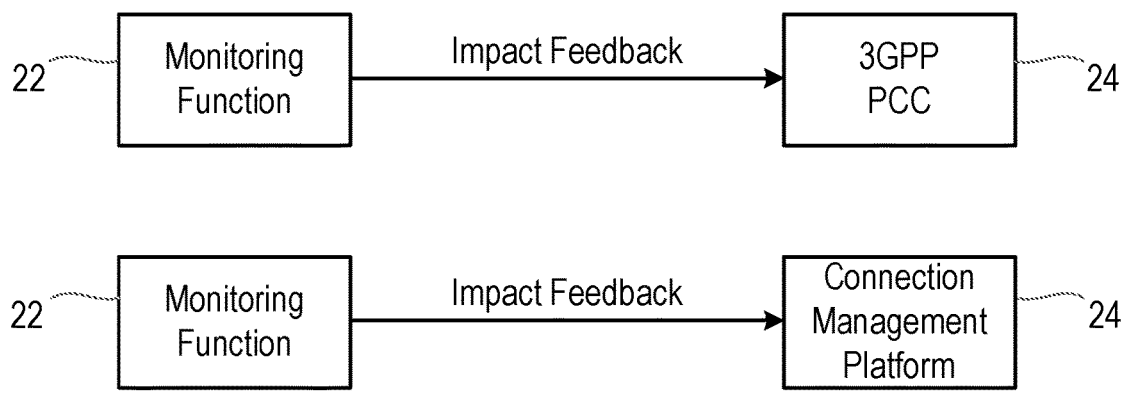
FIG. 8 illustrates communication between a monitoring function and resource management functions.

FIGS. 7 and 8 illustrate communication between the monitoring function 22 and the M2M functions unit 16 and IVR unit 14, and between the monitoring unit 22 and the resource management functions 24. The monitoring function 22 receives information from the IVR unit 14 and M2M functions unit 16, enabling the assembly of impact calculations. These impact calculations are then forwarded as feedback to the resource management functions 24.

Figure 9:
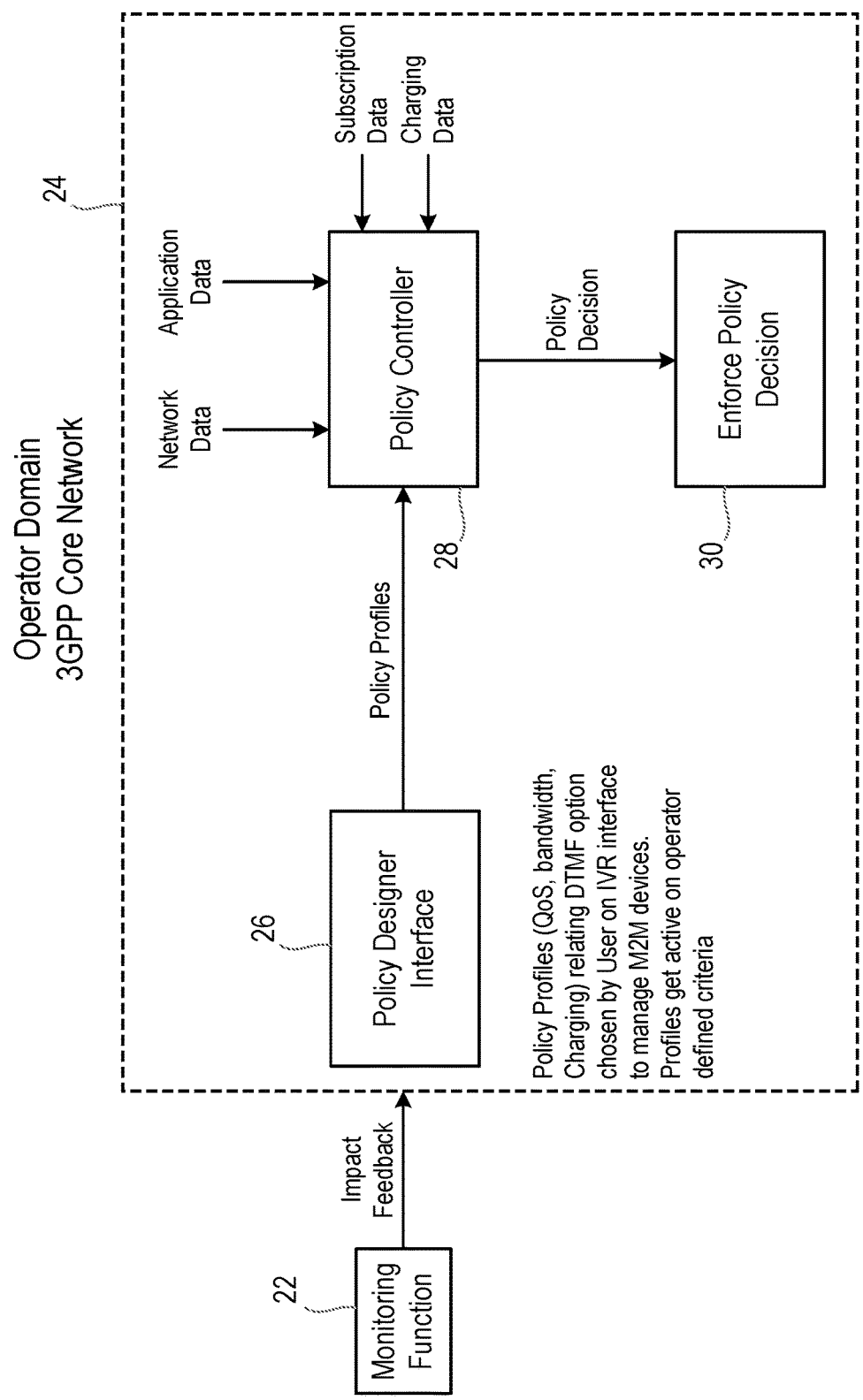
FIG. 9 is a schematic representation of functional elements in a resource management function.
Figure 10:
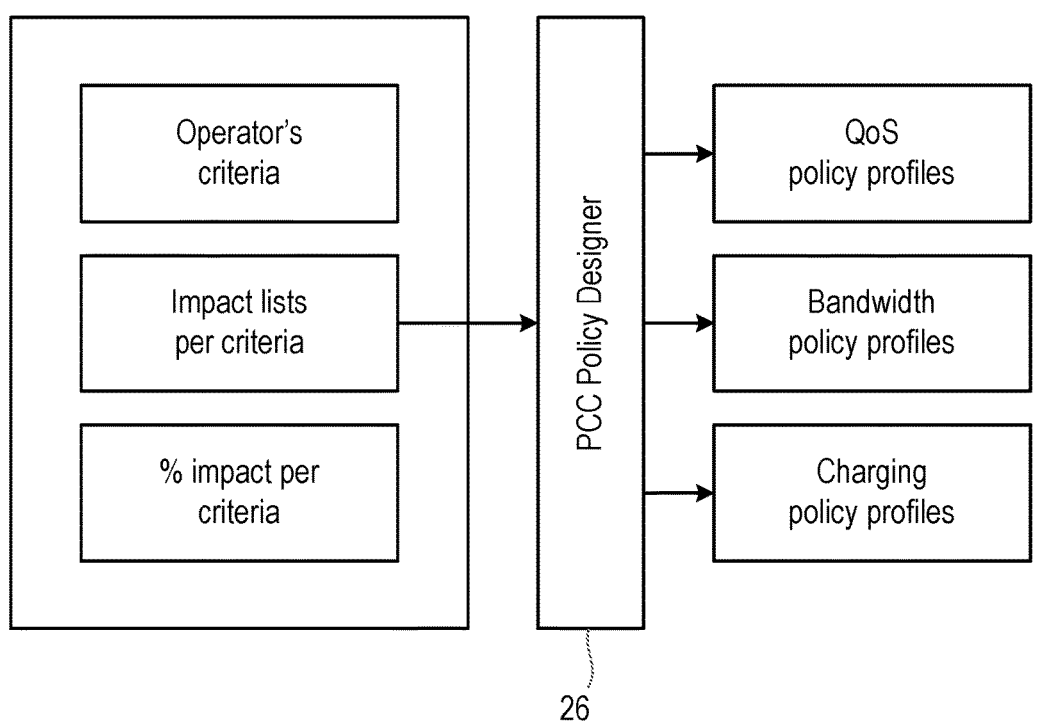
FIG. 10 illustrates input to and output from a resource management function.

FIG. 9 illustrates one example of a resource management function 24. The example resource management function 24 is a PCC node comprising a policy designer interface 26, a policy controller 28 and a policy enforcer 30. The PCC node 24 receives feedback from the monitoring function 22 in the form of impact calculations as discussed above. The policy designer interface 26 establishes policies appropriate for the received feedback. This may be through the creation of new policies or the modification of existing policies. The policies may relate to Quality of Service (QoS), bandwidth, charging or any other resource which the communication network operator seeks to manage to mitigate the impact of the action corresponding to the user instruction received at the IVR platform. Example policies may manage access to bandwidth or certain QoS levels, or may adapt charging models to mitigate the impact of the instructed action upon the network. The established policies are passed to the policy controller 28, which also receives input in the form of network and application data, subscription data and charging data. The policy controller 28 manages the application of the established policies according to operator criteria and network conditions. The policy controller 28 activates the policies established by the policy designer interface 26 by forwarding a policy decision to the policy enforcer 30. Policies may be activated as soon as an action triggering a policy is instructed via the IVR platform. An activated policy may prioritise or de-prioritise certain traffic in order to maintain network performance.

The action of the policy designer 26 is schematically illustrated in FIG. 26, which illustrates impact feedback being input to the policy designer 26 in the form of impact calculations and criteria, and policy profiles being output from the policy designer, the profiles applying to QoS, bandwidth and charging.

Network connection policies may be similarly established and activated by a resource management function 24 in the form of a network Connection Management Platform. Cloud computing resources may also be managed through the establishing and activating of resource management policies by a resource management function 24 in the form of a Cloud Computing Management node. The Connection Management Platform and Cloud Computing Management node may receive impact feedback directly from the monitoring function 22, or the impact feedback may be forwarded to them from a PCC node which has received the impact feedback directly from the monitoring function 22.

Figure 11:
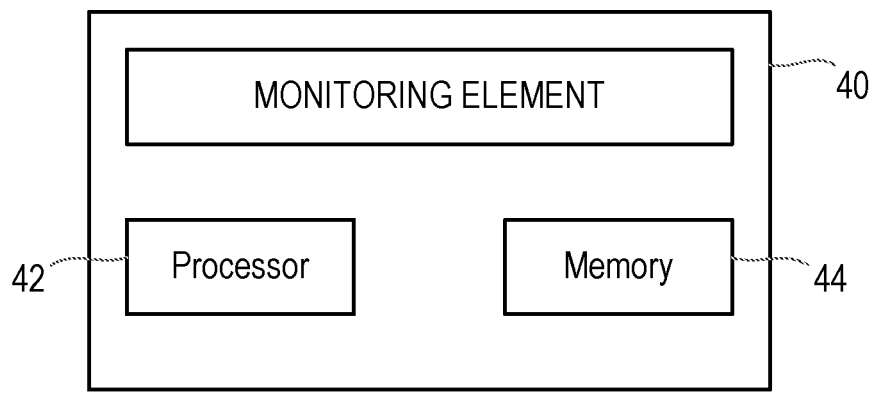
FIG. 11 is a block diagram illustrating functional elements in a monitoring element.
Figure 12:
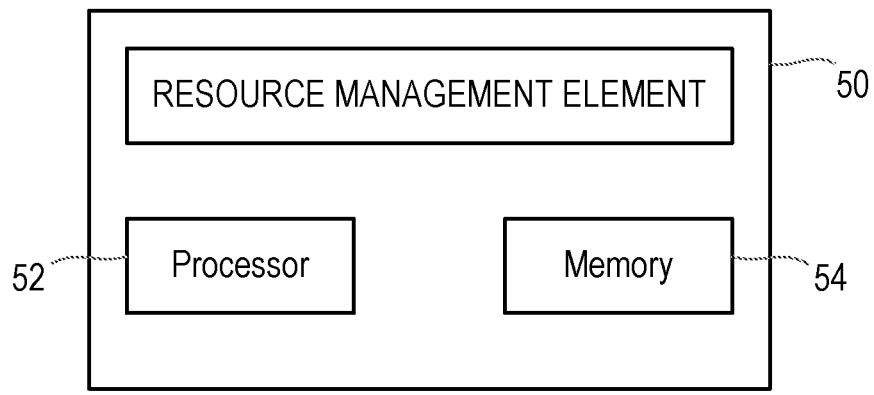
FIG. 12 is a block diagram illustrating functional elements in a resource management element.

The methods of the present invention may be conducted in a monitoring element, housing the resource monitoring function, and in a resource management element, housing the resource management function. The monitoring element may for example be comprised within a gateway node or within a core node of a communication network. The resource management element may be comprised within a PCC, a Connection Management Platform, a Cloud Computing Management node, or any other resource management node. The methods may be conducted on receipt of suitable computer readable instructions, which may be embodied within a computer program running on the monitoring element or resource management element. FIGS. 11 and 12 illustrate first examples of a monitoring element 40 and a resource management element 50 which may execute the methods of the present invention, for example on receipt of suitable instructions from a computer program. Referring to FIGS. 11 and 12, each of the monitoring element 40 and resource management element 50 comprises a processor 42, 52 and a memory 44, 54. The memory 44, 54 contains instructions executable by the processor 42, 52 such that the monitoring element 40 is operative to conduct the methods 100 of FIGS. 2 and 4 and the resource management element 50 is operative to conduct the method 200 of FIG. 3.

Figure 13:
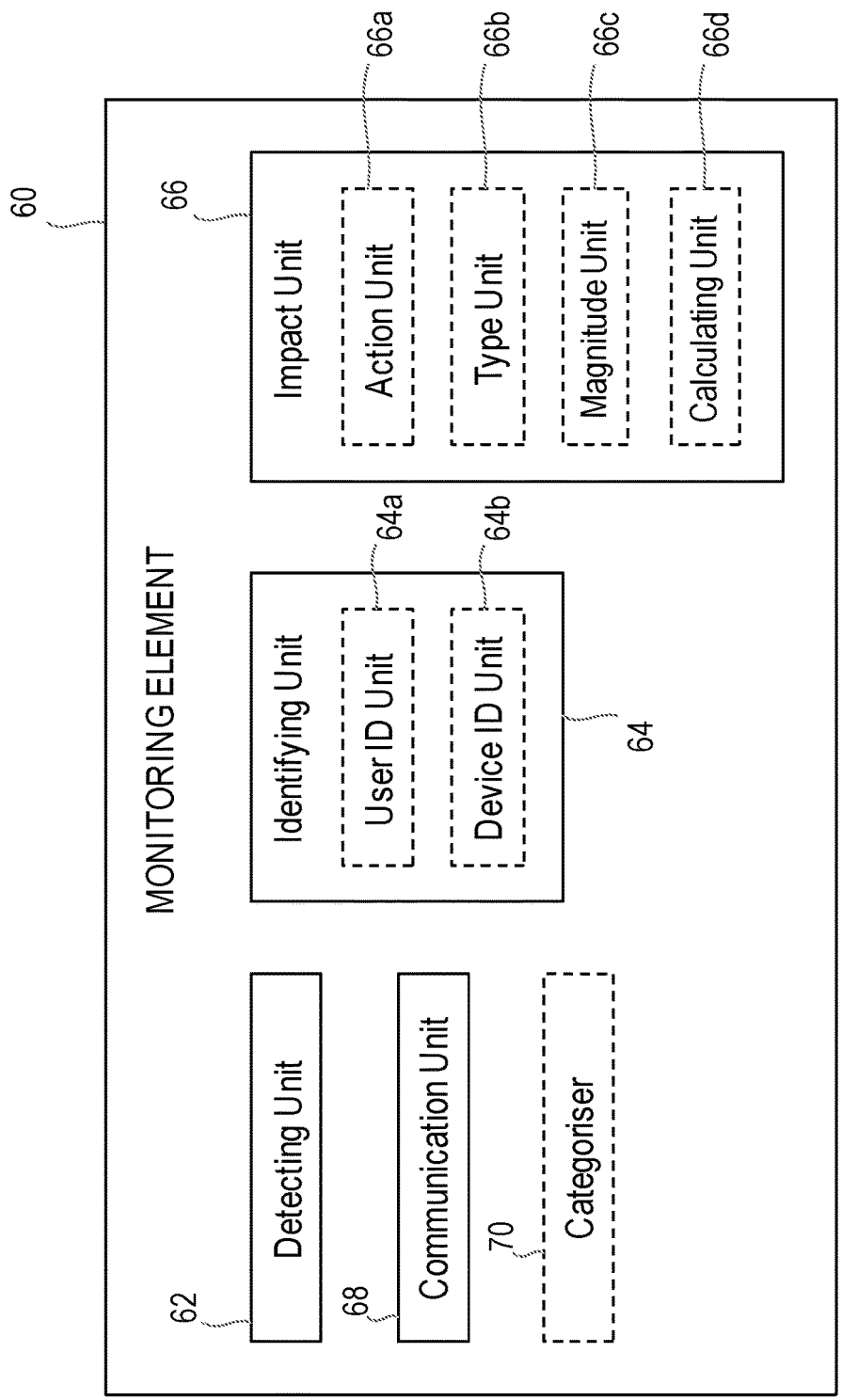
FIG. 13 is a block diagram illustrating functional elements in another example of monitoring element.

FIG. 13 illustrates functional units in another embodiment of monitoring element 60 which may execute the methods 100 of the present invention, for example according to computer readable instructions received from a computer program. It will be understood that the units illustrated in FIG. 13 are functional units, and may be realised in any appropriate combination of hardware and/or software.

Referring to FIG. 13, the monitoring element 60 comprises a detecting unit 62, configured to detect issuance of a user instruction specifying an action to be carried out by an M2M device, an identifying unit 64, configured to identify M2M devices subject to the user instruction, an impact unit 66, configured to calculate an impact upon a communication network of completion of the action by the identified M2M devices, and a communication unit 68, configured to send the calculated impact to a resource management function. The detecting unit 62 may be configured to detect issuance of an instruction by detecting accessing by a user device of an Interactive Voice Response, IVR, platform for M2M functionality.

The identifying unit 64 may comprise a user ID unit 64a, configured to identify the user issuing the instruction, for example by identifying a user device accessing an IVR platform or by receiving user identification data input by the user to the IVR platform. The identifying unit 64 may also comprise a device ID unit 64b, configured to identify M2M devices associated with the identified user. Identifying the M2M devices may comprise obtaining an identifier of M2M devices subject to the user instruction. The device ID unit 64b may also be configured to identify a subset of the M2M devices associated with the identified user, which subset is subject to the user instruction.

The monitoring element 60 may also comprise a categoriser 70, configured to categorise the identified M2M devices according to at least one of a device type, a device group with which the device is associated, a service provided by the device, a service provider associated with the device, an application running on the device, a network traffic class supported by the device or a subscription associated with the device.

The impact unit 66 may further comprise an action unit 66a, configured to identify the action associated with the received user instruction. The action unit 66a may be configured to identify the action by identifying the received user instruction and consulting a database to obtain an action specified by the instruction. Identifying the instruction may comprise identifying a DTMF option selected by the user device. The impact unit may further comprise a type unit 66b, configured to determine an impact type from the identified action, a magnitude unit 66c, configured to determine an impact magnitude from the identified M2M devices, and a calculation unit 66d, configured to assemble the impact type and impact magnitude into a network impact calculation. The impact unit 66 may be configured to assemble at least one impact calculation according to a criterion.

Figure 14:
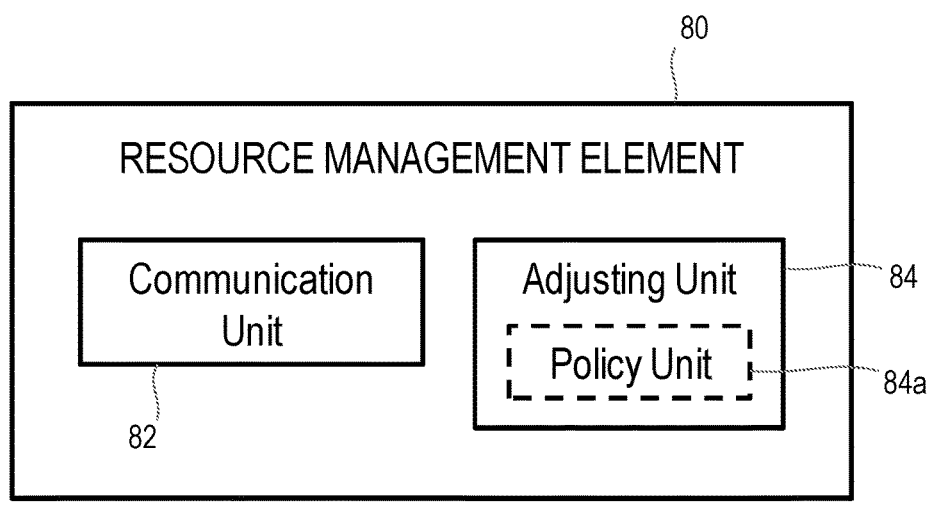
FIG. 14 is a block diagram illustrating functional elements in another example of resource management element.

FIG. 14 illustrates functional units in another embodiment of resource management element 80 which may execute the method 200 of the present invention, for example according to computer readable instructions received from a computer program. It will be understood that the units illustrated in FIG. 14 are functional units, and may be realised in any appropriate combination of hardware and/or software.

Referring to FIG. 14, the resource management element 80 comprises a communication unit 82, configured to receive, from a monitoring function, a calculated impact upon a communication network of completion of an action by M2M devices subject to a user instruction specifying the action, and an adjusting unit 84 configured to adjust resource allocation within the network according to the calculated impact. The communication unit 82 may receive the calculated impact from a monitoring element as illustrated in FIG. 13. The adjusting unit 84 may comprise a policy unit 84a, which may be configured to establish a resource management policy to mitigate the calculated impact. The policy unit may also be configured to prioritise at least one class of traffic within the network. The policy unit may also be configured to limit access to resources by the M2M devices subject to the instruction or to increase resources available to the M2M devices subject to the instruction or to adjust a charging model according to the calculated impact.

Aspects of the present invention thus provide methods and apparatus enabling communications network operators to manage the impacts of M2M devices upon their network. Large numbers of M2M devices may take action following receipt of a single user instruction for example delivered via an IVR or other management platform. Such large scale activity may have an impact upon network performance, which impact may be localised, for example to a particular geographic area or to a particular domain or sector such as transport, utilities, public safety, agriculture etc. Aspects of the present invention enable an impact of the instructed action to be assessed and allow for the generation of policies to mitigate that impact. In this manner, network performance may be assured, with completion of the instructed action being prevented from adversely impacting the overall network performance or provision of network services to other users. Network outages and disruptions owing to large scale M2M activity may be reduced or eliminated, so offering considerable advantages to network operators and their customers.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

We claim:

1. A method, in a monitoring function, for monitoring resource usage in a communication network comprising a plurality of Machine-to-Machine (M2M) devices, the method comprising:
   detecting issuance of a user instruction, the user instruction specifying an action to be carried out by at least one of the M2M devices;
   identifying M2M devices subject to the user instruction;
   calculating an impact upon the communication network of completion of the action by the identified M2M devices, wherein calculating the impact upon the communication network of completion of the action by the identified M2M devices comprises:
   identifying the action;
   determining an impact type from the identified action;
   determining an impact magnitude from the identified M2M devices; and
   assembling the impact type and impact magnitude into a network impact calculation; and
   sending the calculated impact to a resource management function.

2. The method of claim 1, wherein detecting issuance of a user instruction comprises detecting accessing by a user device of an Interactive Voice Response (IVR) platform for M2M functionality.

3. The method of claim 1, wherein identifying M2M devices subject to the user instruction comprises at least one of:
   identifying the user issuing the instruction, and
   identifying M2M devices associated with the identified user.

4. The method of claim 3, wherein identifying the user issuing the instruction comprises at least one of:
   identifying the user device accessing the IVR platform;
   receiving user identification data input by the user to the IVR platform;
   identifying a subset of the M2M devices associated with the identified user, which subset is subject to the user instruction; and
   obtaining an identifier of M2M devices subject to the user instruction.

5. The method of claim 1, further comprising categorizing the identified M2M devices according to at least one of:
   a device type;
   a device group with which the device is associated;
   a service provided by the device;
   a service provider associated with the device;
   an application running on the device;
   a network traffic class supported by the device; and
   a subscription associated with the device.

6. The method of claim 1, wherein the action comprises at least one of:
   connecting to the communication network;
   disconnecting from the communication network;
   sending data via the communication network; and
   receiving data from the communication network.

7. The method of claim 6, wherein identifying the action comprises identifying the instruction and consulting a database to obtain an action specified by the instruction.

8. The method of claim 7, wherein identifying the instruction comprises identifying a Dual Tone Multi Frequency (DTMF) option selected by the user device.

9. The method of claim 1, wherein determining an impact magnitude comprises determining at least one impact magnitude according to a criterion.

10. The method of claim 9, wherein the criterion comprises at least one of device type;
    device attribute;
    device network identity; and
    impact footprint.

11. The method claim of 1, wherein sending the calculated impact to a resource management function comprises sending the criterion.

12. The method of claim 1, wherein sending the calculated impact to a resource management function comprises sending the calculated impact to at least one of:
    a Policy Charging and Control (PCC) node,
    a Connection Management Platform, and
    a Cloud Computing Management node.

13. A method, in a resource management function, for managing resources in a communication network comprising a plurality of Machine-to-Machine (M2M) devices, the method comprising:
    receiving, from a monitoring function, a calculated impact upon the communication network of completion of an action by M2M devices subject to a user instruction specifying the action; and
    adjusting resource allocation within the network according to the calculated impact,
    wherein the impact is calculated by:
    identifying the action;
    determining an impact type from the identified action;
    determining an impact magnitude from the identified M2M devices; and
    assembling the impact type and impact magnitude into a network impact calculation.

14. The method of claim 13, wherein adjusting resource allocation within the network according to the calculated impact comprises at least one of:
    establishing a resource management policy to mitigate the calculated impact;
    prioritising at least one class of traffic within the network;
    limiting access to resources by the M2M devices subject to the instruction; and
    increasing resources available to the M2M devices subject to the instruction.

15. A computer program product comprising a non-transitory computer readable medium storing instructions for configuring a monitoring function for monitoring resource usage in a communication network comprising a plurality of Machine-to-Machine (M2M) devices comprising:
    detecting issuance of a user instruction, the user instruction specifying an action to be carried out by at least one of the M2M devices;

identifying M2M devices subject to the user instruction;
calculating an impact upon the communication network of completion of the action by the identified M2M devices, wherein calculating the impact upon the communication network of completion of the action by the identified M2M devices comprises:
identifying the action;
determining an impact type from the identified action;
determining an impact magnitude from the identified M2M devices; and
assembling the impact type and impact magnitude into a network impact calculation; and
sending the calculated impact to a resource management function.

16. A monitoring element configured for monitoring resource usage in a communication network comprising a plurality of Machine-to-Machine (M2M) devices, the monitoring element comprising a processor and a memory, the memory containing instructions executable by the processor such that the monitoring element is configured to carry out a method comprising the steps of:
detecting issuance of a user instruction, the user instruction specifying an action to be carried out by at least one of the M2M devices;
identifying M2M devices subject to the user instruction;
calculating an impact upon the communication network of completion of the action by the identified M2M devices, wherein calculating the impact upon the communication network of completion of the action by the identified M2M devices comprises:
identifying the action;
determining an impact type from the identified action;
determining an impact magnitude from the identified M2M devices; and
assembling the impact type and impact magnitude into a network impact calculation; and
sending the calculated impact to a resource management function.

17. A resource management element, configured for managing resources in a communication network comprising a plurality of Machine-to-Machine (M2M) devices, the resource management element comprising a processor and a memory, the memory containing instructions executable by the processor such that the resource management element is configured to carry out a method comprising the steps of:
receiving, from a monitoring function, a calculated impact upon the communication network of completion of an action by M2M devices subject to a user instruction specifying the action; and
adjusting resource allocation within the network according to the calculated impact,
wherein the impact is calculated by:
identifying the action;
determining an impact type from the identified action;
determining an impact magnitude from the identified M2M devices; and
assembling the impact type and impact magnitude into a network impact calculation.

* * * * *